No. 883,821. PATENTED APR. 7, 1908.
F. J. MONAHAN.
EXCAVATING MACHINE.
APPLICATION FILED OCT. 1, 1906.
5 SHEETS—SHEET 3.
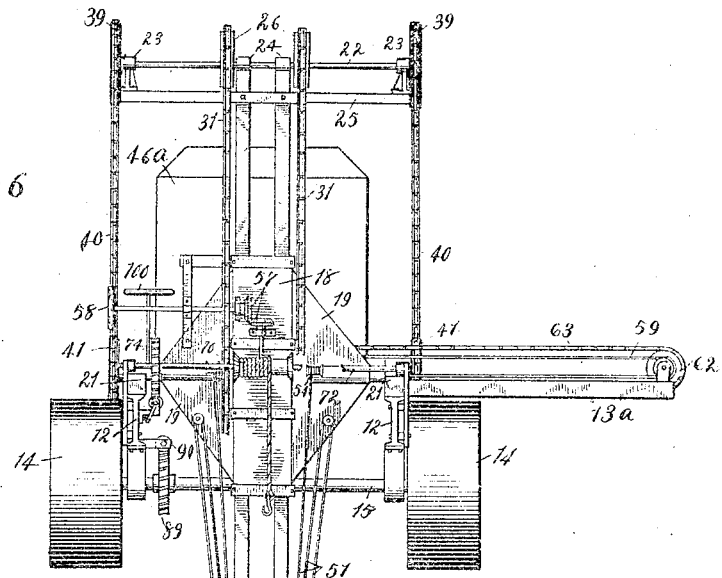
Fig 6
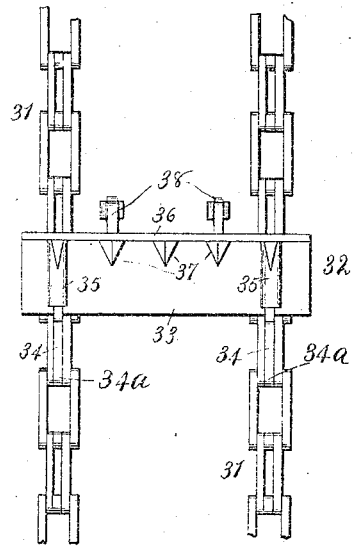
Fig 7
Fig 8
Witnesses:
Chas. F. Bassett
M. Marty
Inventor
Frank J. Monahan
By Frederick Benjamin
Atty.

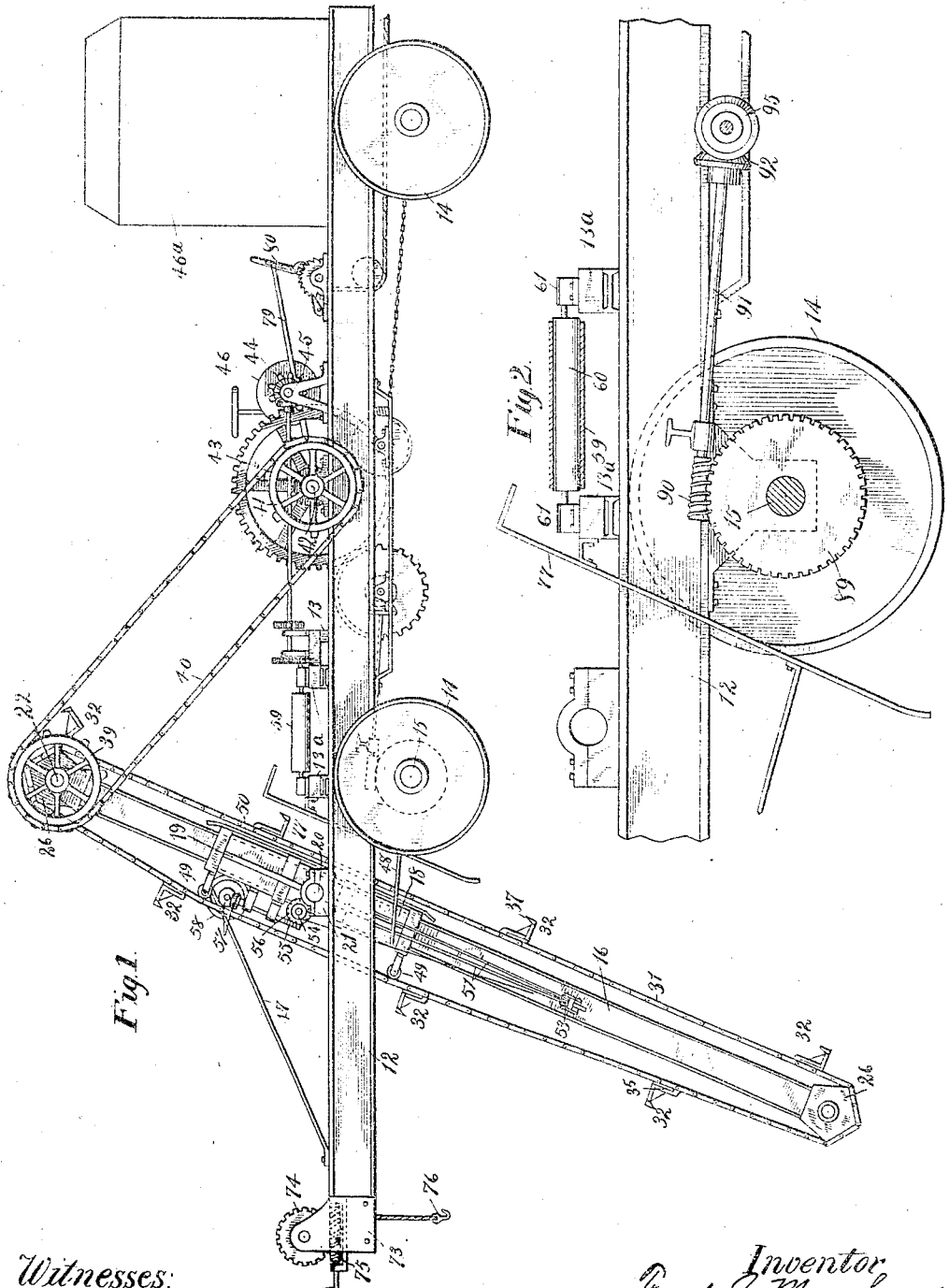

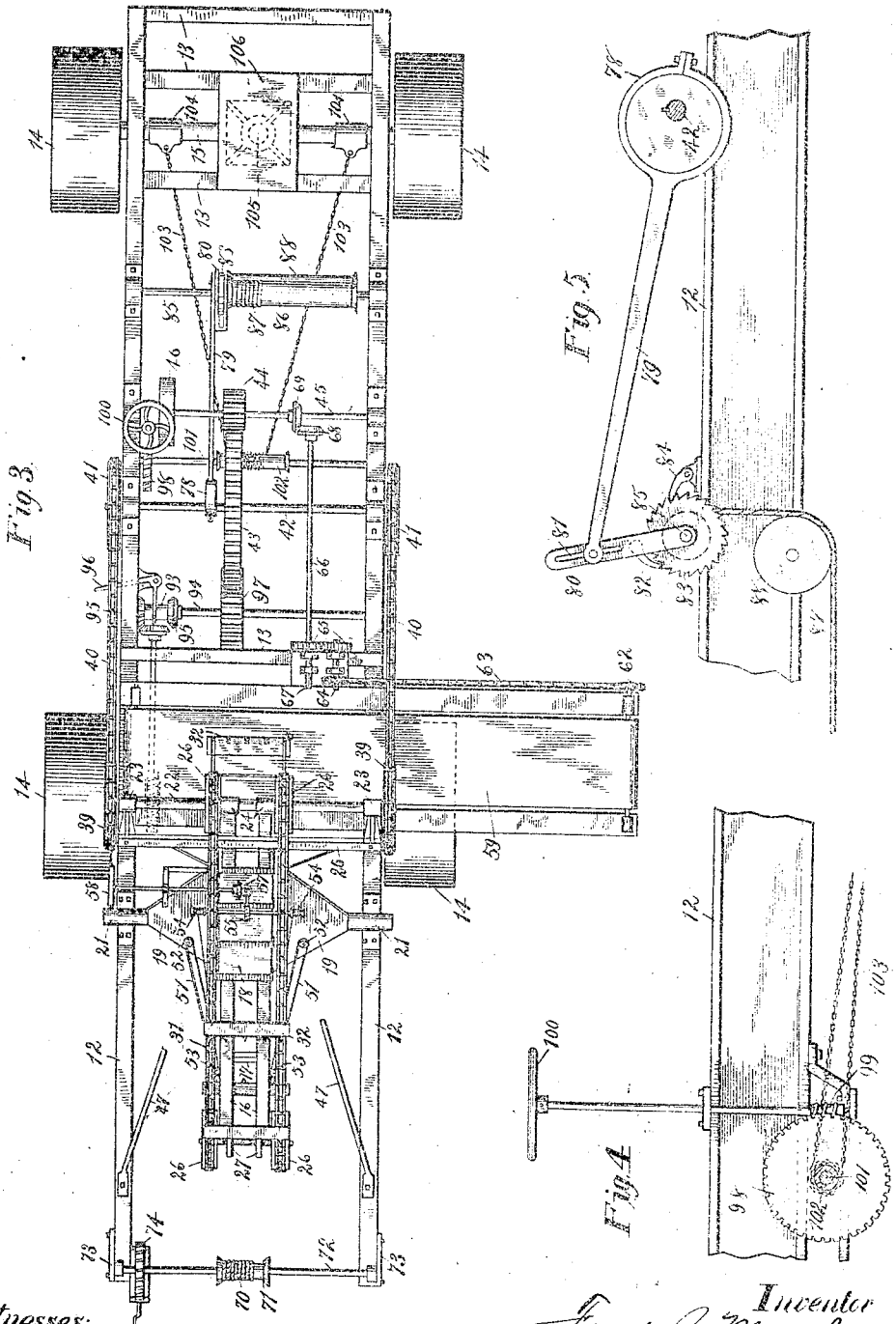

No. 883,821. PATENTED APR. 7, 1908.
F. J. MONAHAN.
EXCAVATING MACHINE.
APPLICATION FILED OCT. 1, 1906.
5 SHEETS—SHEET 4.
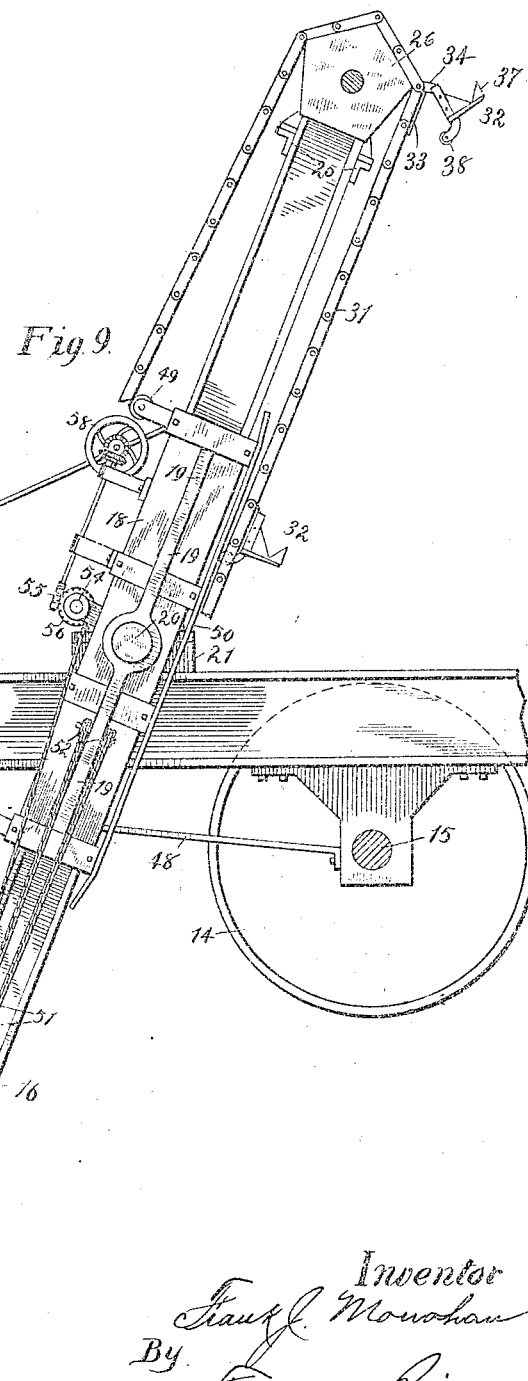

No. 883,821.   PATENTED APR. 7, 1908.
F. J. MONAHAN.
EXCAVATING MACHINE.
APPLICATION FILED OCT. 1, 1906.
5 SHEETS—SHEET 5.
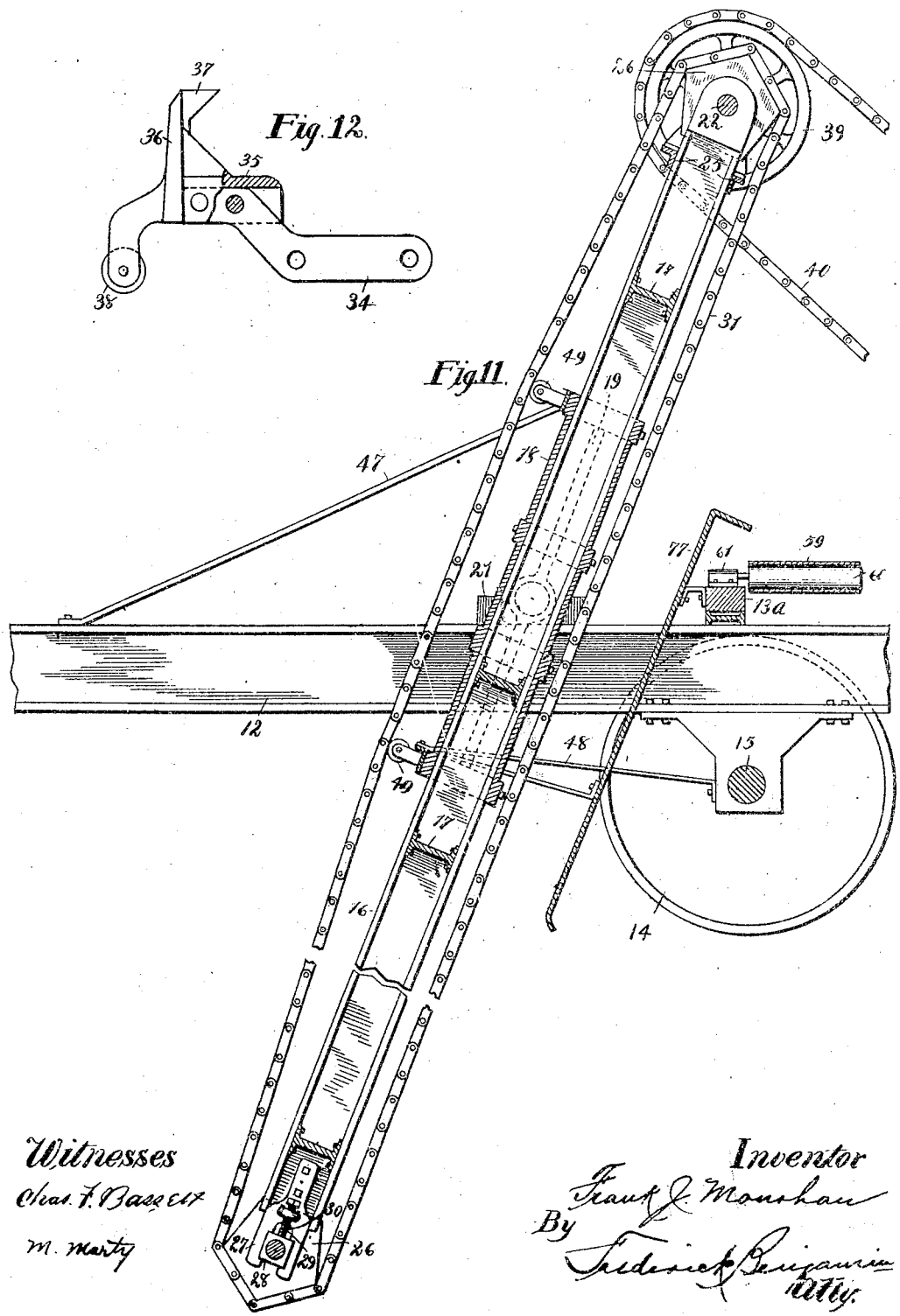
Witnesses
Chas. F. Bassett
M. Marty
Inventor
Frank J. Monahan
By Frederick Benjamin
Atty.

UNITED STATES PATENT OFFICE.

FRANK J. MONAHAN, OF JOLIET, ILLINOIS.

EXCAVATING-MACHINE.

No. 883,821.

Specification of Letters Patent.

Patented April 7, 1908.

Application filed October 1, 1906. Serial No. 336,322.

*To all whom it may concern:*

Be it known that I, FRANK J. MONAHAN, citizen of the United States, residing at Joliet, in the county of Will and State of Illinois, have invented certain new and useful Improvements in Excavating-Machines, of which the following is specification.

My invention relates to excavating machines and has special reference to apparatus designed for digging ditches, canals and any similar work in earth that is free from large stones or rock.

The more important objects of my improvement are to furnish a machine for excavating in which the construction and arrangement of the frame and working devices are such as to produce a mechanism having maximum strength combined with a minimum weight; to provide an apparatus for ditching and analogous purposes so designed that its capacity can be increased or diminished by the addition or removal of the operative elements thus adapting it to work successfully in all soils however differing in texture or tenacity; to supply means in an excavating machine for varying the character of the work done by substituting for certain operative parts others having a similar function but differing in size and design; to produce a mechanism for the purpose indicated furnished with means for varying the speed of the operative elements to correspond with the character of the work to be done and the nature of the ground to be removed; to provide means for utilizing the power from a single source for a multiplicity of functions such as excavating, conveying, traction and steering; to provide an improved transmission whereby the operative mechanism will be under more complete control and by means of which a higher efficiency will be attained; to produce a digging and conveying apparatus supplied with facilities for readily and easily adjusting the excavating mechanism so as to vary the depth of the cut; to provide means for disposing of the excavated material at a suitable distance from the cut made so that it will not interfere with the traction movements; to provide an excavating apparatus having a plurality of digging elements so designed and constructed as to combine the several functions of loosening the soil, conveying the material and automatically depositing it at the desired location; to provide digging elements that will be more effective with a given amount of power than those previously designed; to produce a machine for the purposes set forth that will perform continuously and successfully the combined functions of loosening, conveying, advancing and steering; to provide a more simple and durable construction, being so designed as to be easily built without the necessity of furnishing special tools and machinery thus promoting economy of manufacture; and to improve in a general way the structural design with a view to eliminate common defects and to bring the constructive elements into such relation and to so distribute the material that the proper strength and weight will be combined to give the best results.

I obtain the above and other minor objects generally speaking, by the employment of a substantial framework supported upon traction wheels, and provided with an adjustable frame carrying a series of movable excavating elements attached to endless chains, the whole being furnished with the necessary gearing, appurtenances and connection, with a power plant carried upon said framework.

In the accompanying drawings which form a part of this specification and in which the preferred embodiment of my improved excavating machine is fully illustrated—Figure 1 is a side elevation; Fig. 2 is a fragmentary view, enlarged, showing more particularly the traction mechanism; Fig. 3 is a top plan view of the complete machine; Fig. 4 is a fragmentary view, enlarged, showing in detail a portion of the steering apparatus; Fig. 5 is an enlarged fragmentary view of the feeding mechanism; Fig. 6 is a front elevation; Figs. 7 and 8 are a top plan view and a side elevation respectively, of one of the digging elements; Fig. 9 is a side view of the adjustable excavator frame with the lower portion broken away; Fig. 10 is a front elevation of a digging element; Fig. 11 is a sectional view of the excavator frame with the digging elements removed; Fig. 12 is an end elevation of a digging element removed from the elevator chain.

Referring to the drawings the numeral 12 designates the main sills of the supporting framework which are preferably formed of structural iron in the shape of I-beams. These beams are joined into a stress resisting parallelogram by cross members of the same material upon which are located the power plant and connecting gearing. The framework 12 is carried on two pairs of traction wheels, having a suitable design that will adapt them to the class of work required, and these wheels are joined by axles 15 to which the said wheels are keyed so that they revolve in unison. The excavating device proper is located between the main sills 12 and supported thereon. It consists of a strong frame formed of two side members 16 in the form of I-beams rigidly held together by cross pieces 17, the whole forming a single adjustable girder which is adapted to slide longitudinally in a supporting box or frame 18 rectangular in form furnished with strengthening ribs and provided with laterally projecting webs 19 which give added strength to the structure, and carry lateral trunnions 20 which are journaled in suitable boxes 21 bolted to the upper margins of the sills 12. The members 16 thus combined into a girder or frame have therefore two movements, the longitudinal adjustment in the box-frame 18 and a racking or oscillating motion upon the trunnions 20. Said frame 16 carries upon its upper end a transverse shaft 22 journaled in boxes 23, 24, the latter being secured to the upper ends of the frame members 16 while the frames are borne upon the outer extremities of a cross piece of angle iron 25 securely bolted to the members 16 adjacent to their ends. Upon the shaft 22 external to, but in close proximity with, the side beams 16 are fixed pentagonal sprocket wheels 26. There are two pairs of these wheels, those just described and a duplicate pair carried on the opposite end of the adjustable frame 16 the shaft of the latter pair being supported upon arms 27, which carry the journal boxes 28 which are grooved and adapted to slide in slots 29 formed in said arms 27 and are adjustable longitudinally of the frame by means of screws 30. The sprocket wheels 26 engage connecting sprocket chains 31 to which the excavating elements 32 are attached. Seven such devices are shown in Fig. 1, secured to the elevating chain 31, but it is evident that the number can be varied to suit conditions as they occur. These devices are each composed of a bed-plate 33, rigidly fixed to the parallel chains 31 in any suitable manner. To the said chains are attached arms 34, pivoted to the link at 34ª, their other ends being offset so that they can extend over said bed plate to engage sockets 35 formed integral with a back plate 36, from which project digging points 37, preferably fashioned like the shovel points of a cultivator, although this feature may be varied if desirable. To the rear face of each back plate are attached duplicate friction rollers 38. Upon the outer ends of the shaft 22 are sprockets 39 for driving said shaft, motion being imparted thereto through sprocket chains 40, which engage sprockets 41 fixed to a counter shaft 42 carrying an intermediate gear wheel 43 meshing with a smaller wheel 44 carried by a main shaft 45 upon the end of which is mounted a driving pulley 46 which receives motion from a power plant 46ª represented diagrammatically in Figs. 1 and 6.

To prevent any rocking movement of the frame 16 upon its trunnions during the operation of digging I provide removable tie rods 47, 48, which are secured at one end to the girder 16 and at the other bolted fast to any convenient part of the framework. If it is at any time thought desirable to vary the angle which the frame 16 makes with the main frame when excavating, the said tie-rods 47 and 48 are removed and others of different lengths substituted therefor, or a series of holes may be formed in the frame to facilitate the adjustment of the same tie pieces. From the box frame 18 are projecting arms carrying rollers 49 which engage the chains 31 to prevent their sagging sufficiently to interfere with the mechanism attached to the said frame. Upon the opposite or under side of the frame are secured channel irons 50 with which the rollers 38 of the excavating elements engage during their travel upwardly along the face of the frame, the object being as in the case of the opposite rollers 49 to prevent interference with the apparatus. Since the frame 16, as previously stated, is free to move longitudinally in the box frame 18 some provision must be made to readily shift it to various positions and to securely hold it in place when so adjusted. For this purpose a cable 51 is provided which passes through compound pulley blocks 52, 53, the former being attached to the frame 18, which serves as the fixed point, the latter being secured to the girder 16 which is the weight to be moved. A sufficient number of pulleys are employed to provide enough power to easily move the girder and its attachments in either direction, up or down. The free ends of the cables after leaving the pulleys are carried up to windlasses 54. A worm 55 meshing with a wheel 56 attached to the windlass shaft 54 is actuated by bevel gears 57 which are operated by a hand wheel 58 at the side of the machine. An endless apron 59 is arranged transversely to the main sills 12 and is carried over suitable rollers 60 the shafts of which are journaled in boxes 61 mounted upon beams 13ª. Upon the shaft of one of the said rollers 60 is mounted a sprocket 62 connected by a chain 63 with a sprocket 64 actuated by a pair of gears 65, one of which is carried on the same shaft as the sprocket 64 and the other upon a parallel shaft 66. When it is desired to reverse the movement of the apron 59, which is necessary when the endless apron is extended laterally upon the opposite side of the frame 12 which is done by shifting the supporting joists 13ᵃ laterally to the distance required, the sprocket 64 is transferred to the end 67 of the shaft 66, the chain 63 being proportionally changed in length. The shaft 66 carries a bevel gear 68 which is in mesh with a gear 69 fixed to the main shaft 45.

Near the front of the base frame 12 is arranged a hoisting apparatus for tilting or rocking the girder 16 and its frame 18 upon the trunnions 20. Said apparatus comprises a cable 70 which winds upon a windlass 71 carried on a shaft 72 journaled in bearings 73 bolted to the main frame as shown in Figs. 1 and 3.

Upon the shaft 72 is keyed a worm gear 74 which is turned by a manually operated worm 75. To the free end of said cable 70 is fixed a hook 76 which may be made to engage any convenient portion of the frame 16 and the latter can then be rocked upon its journals by means of the mechanism just described, the braces 47 and 48 having been first removed. By combining the two movements set up by turning the hand wheel 58 and the worm 75 the girder 16 can be raised and lowered or rocked forward or back through a wide angle. A fixed apron 77 is secured to the framework in the rear of the girder 16 and is inclined at approximately the same angle as that of the said girder. The function of this is to prevent loose earth from falling upon the mechanism and to deflect the material when dumped upon the endless apron 59.

The shaft 42 carries an eccentric 78, its rod being pivoted to an arm 80 in which is a slot 81 to permit of a radial adjustment of the pivot in order to vary the movement of said arm by the reciprocation of the eccentric rod 79. To said rod 80 is attached a pawl 82 which engages ratchet teeth formed in the periphery of a wheel 83. A retaining pawl 84 prevents any back lash when the device is in operation. The arm 80 is pivotally attached to a shaft 85 upon which the wheel 83 is fixed, and upon the same shaft is mounted a windlass 86 about which a cable 87 is wound, the end after leaving the windlass passing around a drum 88 for the purpose of changing its direction and is carried a suitable distance to the rear of the apparatus where it is firmly anchored in the ground or secured to some fixed object, such as a post or tree.

To the front axle 15 of the traction wheels 14 is keyed a worm gear 89 with which a worm 90 is in engagement. The latter is fixed on a shaft 91 which is caused to rotate in either direction by means of a reversing gear, which comprises a movable sleeve 93 carried on a shaft 94 having bearings in the sills 12. Upon each end of said sleeve 93 are fixed bevel gears 95 which mesh alternately with the said gear 92 when the sleeve 93 and its attached gears 95 are reciprocated by means of a lever 96 pivoted to the frame side 12. Upon the shaft 94 is mounted a pinion 97 which receives motion from the intermediate gear 43.

A worm gear 98 is operated by a worm 99 having a vertical direction, the opposite end of its shaft being supplied with a hand wheel 100. The wheel 98 is keyed to a shaft 101 which carries a windlass 102 about which a chain cable 103 is given a sufficient number of turns to prevent slipping, the free ends of said cable being extended rearwardly to be secured to sleeves 104 revolubly mounted upon the rear traction axle 15. The said axle 15 is pivotally secured to the frame by a turn-table 105 which supports the rear of the main frame by means of a plate 106 fastened to the cross pieces 13. Thus by turning the wheel 100 the rear axle 15 and wheels 14 are under control of the operator and the apparatus can be steered in either direction during the operation of excavating or while the machine is being transported.

The method of operating the apparatus is as follows: The machine having been transported to the required location the first step is to excavate by hand or otherwise a hole sufficiently deep and wide to accommodate the lower end of the sprocket bearing girder or frame 16. By the aid of the hoisting device and the operation of the hand wheel 58 the excavating frame is brought into position and lowered to the required depth. The sprocket chains 40 being in position and the pulley 46 in gear with the source of power, motion is communicated to the sprocket chains 31, carrying the excavating elements 32. By inspecting Fig. 1, it will be observed that the points 37 project upwardly when the elements are upon the lower or right hand side in which position they are ascending. The free end of the cable 87 having been securely anchored, the apparatus will be slowly moved in the direction of the anchor, at a rate of speed determined by the adjustment of the eccentric rod in the slot 81 of the ratchet arm 80. As soon as the advancement is sufficient to bring the points 37 in contact with the side of the excavation they will cut and tear the earth and the loosened soil will be caught by the approximately horizontal back plate and will lodge between said plate and the bed plate 33. As the elements ascend the material is carried upward until the upper sprockets 26 are reached. It will be noticed that each side of said sprockets equals the length of two of the links of the chain 31, and that as each element ascends the arms 34 are in advance. The arrangement is such that when the angle of the sprocket causes the links to which said arm is pivoted to change their direction as compared to the direction of the links to which the bed plate 33 is secured the result will be that the back plate 36 will part company from the said bed plate and the accumulated material will fall by gravity through the gap thus formed, and will be deposited upon the endless apron 59 which lies directly beneath. As the elements pass down the opposite side the parts will resume their initial position relative to each other. On passing around the lower sprocket the same movement will take place, the initial position, however, being quickly resumed just at the beginning of the upward journey. It will be understood that the feeding movement through the medium of the cable 87, the conveying movement produced by means of the endless apron 59 and the combined excavating and elevating motion of the sprocket chain 31 and attachments can be readily adjusted relatively to each other so that the operation will be mutual and simultaneous.

It is obvious that many changes may be made in the devices of my invention as herein disclosed without departing from the spirit and scope thereof, and I do not wish, therefore, to be limited to the precise construction set forth.

What I claim is:—

1. In an excavating machine, the combination with a main frame, of an auxiliary frame, a slide box for said auxiliary frame pivotally supported upon said main frame, and excavating elements carried by said auxiliary frame.

2. In an excavating machine, the combination with a main frame, of an auxiliary frame, a slide-box for said auxiliary frame, trunnions journaled upon the main frame for supporting said slide-box, means for adjusting said auxiliary frame longitudinally in said box, and excavating elements carried upon said auxiliary frame.

3. An excavating machine, including a main supporting frame, an auxiliary frame, a slide-box for the auxiliary frame, trunnions for said box supported upon the main frame, means for adjusting said frame in said box, excavating elements carried by said auxiliary frame, said elements adapted to elevate the excavated material, means for operating said excavating elements, means for depositing the excavated material at a predetermined point in the elevating movement and means for conveying the material out of the line of traction.

4. An excavating machine, including a main frame, an auxiliary frame, a slide-box supporting said auxiliary frame trunnions attached to said box and journaled in the main frame, means for adjusting said auxiliary frame longitudinally in said slide-box, a sprocket-chain carried by said auxiliary frame, excavating and elevating elements attached to said chain, means for operating said chain and excavating elements.

5. An apparatus for the purpose specified including a main frame, traction wheels supporting said frame, steering means for the wheels, an auxiliary frame pivotally mounted upon said main frame and adapted to be longitudinally adjusted, movable excavating elements connected to said auxiliary frame and means for operating said elements.

6. An apparatus for the purpose specified including a main frame, traction wheels supporting said frame, steering means, means for operating said wheels, reversing means for said wheels, an auxiliary frame pivotally mounted upon said main frame, a sprocket chain carried by said auxiliary frame, excavators connected to said chain and means for operating said chain and attached excavators.

7. An excavating machine, including a main frame, an excavating frame, a slide-box supporting said excavating frame, trunnions attached to said slide-box and supported upon the main frame, means for adjusting the excavating frame longitudinally in said box, a pair of sprocket wheels carried at each end of said excavating frame, chains engaging said wheels, a series of excavators connecting said chains, said excavators having separable base and back plates.

8. An excavating machine, including a frame, a supporting slide box on said frame, an auxiliary frame slidably mounted in said box, trunnions for said box journaled in the main frame, means for adjusting the auxiliary frame in said slide-box, a pair of sprocket wheels mounted upon each end of said auxiliary frame, duplicate chains engaging said sprockets, excavating elements connecting said chains, said elements consisting of separable members, and means for depositing the excavated material out of the path of the machine.

9. An excavating machine, including a main frame, a slide box pivotally mounted on said frame, an auxiliary frame slidably mounted in said box, means for manually adjusting said auxiliary frame in said box, sprocket wheels carried upon each end of said auxiliary frame, chains engaging said sprockets, excavators connecting said chains, said excavators having separable base and back members, means for operating said sprockets, and a conveyer for the excavated material.

10. An excavating machine, including a main frame, a slide-box arranged on the frame, an auxiliary frame mounted in said slide-box, trunnions for said box journaled on the main frame, means for adjusting said auxiliary frame in said slide-box, a series of combined excavating and elevating members carried upon said auxiliary frame, means for automatically dumping the excavated material carried by said elevating members, and adjustable means for conveying the deposited material laterally out of the path of the machine.

11. An apparatus for the purpose specified including a main frame, traction wheels supporting the frame, a motor mounted on said frame, a main shaft operated by said motor, a countershaft, driving connections between the shafts, traction mechanism arranged to operate one of the axles of said traction wheels, driving connections between said counter shaft and the traction mechanism, means for reversing said driving connections, an excavating frame carrying a series of independent, successively operating excavators, means for oscillating said excavating frame in an axis transverse to the main frame, means for adjusting the excavating frame longitudinally, and means for rigidly holding the excavating frame in adjusted and oscillated positions.

12. An apparatus for the purpose specified including a main frame, traction wheels supporting the frame and rigidly secured to axles, a motor mounted on said frame, a main shaft operated by said motor, a counter-shaft, driving connections between said shafts, traction mechanism arranged to operate one of the axles of said traction wheels, driving connections between said counter-shaft and the traction mechanism, means for reversing said driving connections, an excavating frame pivotally mounted upon said main frame and adapted to be oscillated upon a horizontal axis, means for rocking the excavating frame upon its centers, means for adjusting the excavating frame longitudinally independently of said horizontal axis, means for securing said excavating frame in any adjusted position, and a series of movable excavators carried upon said excavating frame.

13. An apparatus for the purpose specified including a main frame, traction wheels rigidly fixed to axles and supporting the main frame, a motor mounted on said frame, a main shaft operated by said motor, traction mechanism arranged to operate one of the axles, means for reversing the traction mechanism, steering mechanism arranged to operate one of the said axles, means for reversing said steering mechanism, driving connections between said main shaft and the traction mechanism, an auxiliary frame pivotally connected to said main frame, means for adjusting said auxiliary frame longitudinally, such adjustment being independent of its pivotal connection, and a series of independently operating excavating units carried by said auxiliary frame.

14. An excavating machine including a main frame, traction wheels supporting said frame, traction mechanism arranged to act upon one pair of said wheels, steering mechanism arranged to act upon another pair of wheels, an auxiliary frame pivotally supported on the main frame, means for adjusting the auxiliary frame longitudinally, movable excavating elements carried by said auxiliary frame, means for operating said elements continuously and means for moving the entire apparatus upon said traction wheels synchronously with the operative movement of the operating elements.

15. An excavating machine including a main frame, an auxiliary frame pivotally supported upon said main frame, means for adjusting the auxiliary frame independently of its pivotal connection, a series of excavators arranged to act successively upon the material to be removed and carried by the auxiliary frame, said excavators composed of members having a pivotal relation and adapted to form a receptacle for holding and elevating the excavated material, and means for moving the apparatus longitudinally at a rate proportional to the speed of the excavator movement.

16. An excavating apparatus including a main frame, an auxiliary frame pivotally mounted upon said main frame, means for longitudinally adjusting said auxiliary frame, sprocket wheels carried by the auxiliary frame, operating chains connecting said sprocket wheels, excavators connected to said chains, said excavators composed of base and back plates having a pivotal relation and adapted to form a receptacle for holding and elevating the excavated material, means for automatically separating said plates to deposit the excavated material, means for operating the sprocket wheels and chains, means for feeding the said excavators in a direction transverse to their operative movement, and means for distributing the material excavated at a distance from the line of operation.

17. An excavating apparatus including a series of excavating elements arranged to operate successively upon the material to be removed, means for elevating said elements while operating, means for depositing the material removed at a predetermined point relative to the elevating movement, means for feeding said excavating elements in a direction substantially transverse to the operative movement, and means for regulating the rate of said feed.

18. An excavating apparatus including a main frame, traction wheels supporting said frame, traction mechanism connected with one axle of said wheels, steering mechanism, means for reversing said traction mechanism, means for adjusting the steering mechanism, an auxiliary frame carried upon said main frame and adapted to be oscillated upon a horizontal axis, means for adjusting the auxiliary frame longitudinally, means for rigidly securing said auxiliary frame in adjusted position, a series of excavating elements arranged to operate successively upon the material to be removed, means for elevating said excavating elements during their operative movement, means for automatically removing the material from said elements at a predetermined point relative to the elevating movement, means for moving the apparatus in a direction substantially transverse to the elevating movement and means for regulating the rate of such transverse movement relatively to the speed of the excavating mechanism.

19. An excavating apparatus including a main frame, traction wheels supporting said frame and connected by a plurality of axles, traction mechanism connected with one of said axles, steering mechanism connected with another of the axles, driving means connected with said traction mechanism, means for reversing said traction mechanism, an auxiliary frame carried upon said main frame, means for varying the angle between said auxiliary frame and the main frame, means for adjusting the auxiliary frame longitudinally said adjustment being independent of the means for varying the angular direction, means for rigidly securing the auxiliary frame in adjusted position, a series of excavators arranged to operate successively upon the material to be removed, means for automatically depositing the material removed at a predetermined point relative to the operative movement, means for conveying the material transversely to the line of feed and an apron to protect the mechanism from the deposited material.

20. An excavating machine including a main frame, traction wheels supporting said frame and connected by axles, traction means connected to one of said axles, steering means connected to another of the axles, an auxiliary frame, means for rocking said auxiliary frame upon a horizontal axis and means for adjusting said frame longitudinally, sprockets carried upon the extremities of said auxiliary frame, endless chains connecting the sprockets, a plurality of excavators carried by said chains, means for automatically dumping the excavated material at a predetermined point relative to the operative movement, a protective apron for the mechanism adjacent to the dumping point, an endless conveyer arranged transversely to the main frame, means for shifting said conveyer transversely, means for operating said conveyer, means for reversing the operative movement of the conveyer, and means for feeding the excavators during their operative movement.

21. An excavating machine including a series of excavators arranged to operate successively upon the material to be removed, said excavators consisting of bed plates secured to parallel sprocket chains, movable back plates pivoted to said chains, digging points attached to the back plates, and rollers mounted upon said back plates.

22. An excavating machine including an oscillating frame adapted to be moved longitudinally, a plurality of pentagonal sprocket wheels mounted upon the extremities of said frame, chains connecting said sprocket wheels, a plurality of excavating buckets connected to said chains at intervals, said buckets consisting of bed plates rigidly secured to said chains, movable back plates pivoted to said chains, digging points removably attached to the back plates, rollers mounted upon the back plates, and means for tilting the said back plate at an angle with the bed plate when said buckets are in engagement with the said sprocket wheels.

23. In an excavating machine, a plurality of excavators, each consisting of side members secured to a sprocket chain, a bed plate rigidly secured to said sprocket chain, a back-plate arranged at an angle to the bed-plate and secured to said side members and provided with digging points.

24. In an excavating machine, a plurality of excavators, each consisting of side members secured to a sprocket chain, a bed plate rigidly secured to the sprocket chain, a back plate arranged at an angle to the bed-plate and secured to said side-members and having digging points and anti-frictional means secured to said back-plate.

In testimony whereof I affix my signature in presence of two witnesses:

FRANK J. MONAHAN.

Witnesses:
E. J. GARIGAN,
N. L. LASCH.